United States Patent [19]
Ayers et al.

[11] 3,865,730
[45] Feb. 11, 1975

[54] OIL SPILL CLEANUP

[75] Inventors: Ray R. Ayers; Dean P. Hemphill, both of Houston, Tex.

[73] Assignee: Shell Oil Company, Houston, Tex.

[22] Filed: Dec. 17, 1973

[21] Appl. No.: 425,579

Related U.S. Application Data

[62] Division of Ser. No. 289,043, Sept. 14, 1972.

[52] U.S. Cl. .......................... 210/242, 210/DIG. 21
[51] Int. Cl. ............................................ E02b 15/04
[58] Field of Search ...... 210/83, 242, DIG. 21, 402, 210/403, 404; 55/171–177; 209/198, 200, 209/452, 482; 37/70; 56/9

[56] References Cited
UNITED STATES PATENTS

| | | | |
|---|---|---|---|
| 1,460,558 | 7/1923 | Olden | 37/70 |
| 1,742,294 | 1/1930 | Wood | 210/402 |
| 2,181,863 | 12/1939 | Bell | 56/9 |
| 2,342,321 | 2/1944 | Adams | 210/403 X |
| 2,725,145 | 11/1955 | Mylius | 210/402 |
| 3,555,820 | 1/1971 | Cramer et al. | 55/175 X |
| 3,576,257 | 4/1971 | Yates | 210/242 |
| 3,666,099 | 5/1972 | Galicia | 210/242 |
| 3,734,294 | 5/1973 | Zerbe | 210/242 |

Primary Examiner—Theodore A. Granger
Attorney, Agent, or Firm—Fredrik Marlowe

[57] ABSTRACT

Method and apparatus for removing oil from the surface of a body of water with a skimmer; the apparatus including a skimmer with baffled entry ports arranged on a plane inclined to the direction of current flow or about the periphery of a drum so that oil enters through the baffles into a chamber which is beneath an inverted funnel or within the axle of the drum; the method involving providing a skimmer having submerged baffle entry ports inclined to the direction of current flow, allowing the oil to enter the skimmer, and returning the skimmer to a horizontal position for removal of the oil therefrom through an inverted funnel suspended over the confined oil.

3 Claims, 5 Drawing Figures

OIL SPILL CLEANUP

This is a division of application Ser. No. 289,043, filed Sept. 14, 1972.

BACKGROUND OF THE INVENTION

The collection of small volume oil spills from marine terminals remains a difficult problem. After a spill, the oil generally accumulates at natural and manmade barriers. The usual collecting procedure is to deploy skimmers from shore, utilizing tank trucks or vacuum trucks for oil/water storage. However, the oil generally accumulates in small quantities in a number of different locations, most of which are not easily accessible from shore locations. But even if the spill were accessible from the point along the shore line or wharves, there is still a logistics problem associated with moving skimmers and associated equipment from point to point. Furthermore, since the quantity of oil accumulated at various points is not large, the effectiveness of discrete skimmers in terms of oil to water ratio is quite low, the volume of storage required is sizable which creates a new problem. For instance, using a typical collection rate of 5% oil, a skimmer capable of pumping at a rate of 50 gpm would require storage of 3000 gallons per hour.

The present invention overcomes the above described difficulties and provides a successful and economical solution to the problems of the prior art, as will be apparent from the following description thereof.

SUMMARY OF THE INVENTION

The primary purpose of this invention resides in providing a method and apparatus whereby an oil spill, in particular a small volume spill, can be skimmed from the water in an efficient and economical manner.

The above purpose has been achieved by providing a skimmer having an inclined baffled bottom through which entry of the oil is permitted.

The apparatus of this invention broadly extends to a skimmer having baffled entry ports which are arranged on a plane adjustably inclined or about the periphery of a drum so that oil enters therethrough to a chamber which is beneath an inverted funnel suspended over the interior of the skimmer or which is the axle of the drum, and means for withdrawing oil from the skimmer.

The method broadly extends to the provision of a skimmer having a baffled entry port for permitting entry of the oil into the skimmer and an inverted funnel for withdrawing oil from the top thereof; inclining the skimmer so that the baffled entry port is at an angle relative to current; collecting oil within the skimmer; changing the position of the skimmer to horizontal; and withdrawing oil from the top of the skimmer through the inverted funnel.

Within the framework of the above described method and apparatus, the present invention not only solves the above mentioned problems of the prior art, but also achieves further significant advantages as will be apparent from the description of preferred embodiments following.

DESCRIPTION OF THE PREFERRED EMBODIMENTS

Figure 1:
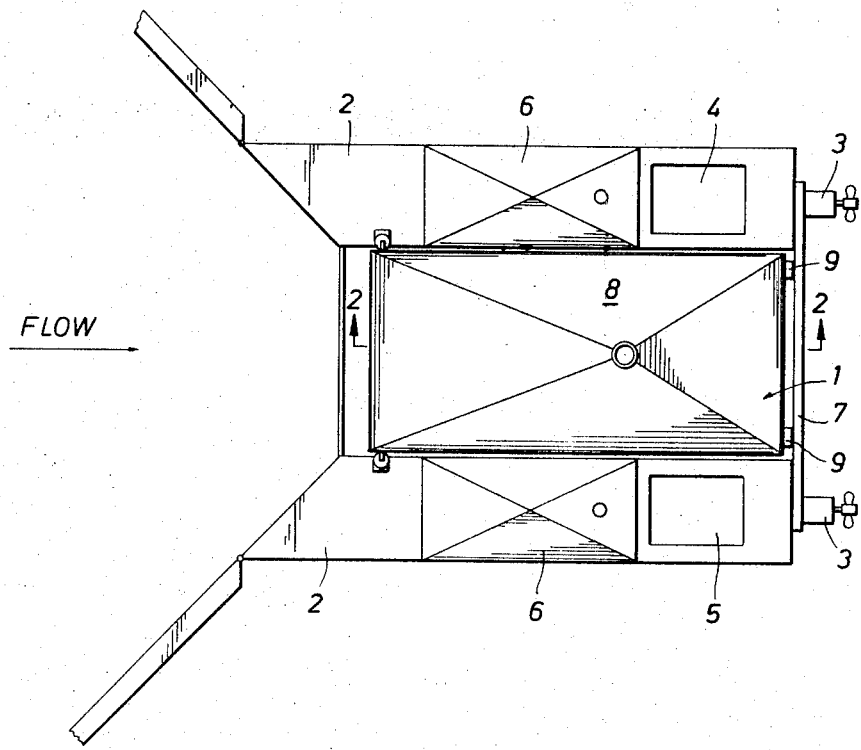
FIG. 1 provides a plan view of the skimmer which shows the skimmer positioned between the sides of a catamaran and held by hinges so as to be pivotable.
Figure 2:
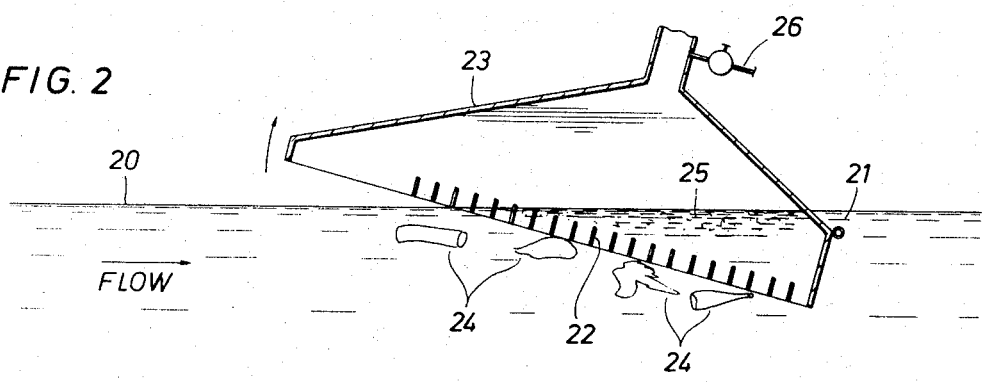
FIG. 2 discloses the position of the skimmer for collection of oil from the surface of the water.
Figure 3:
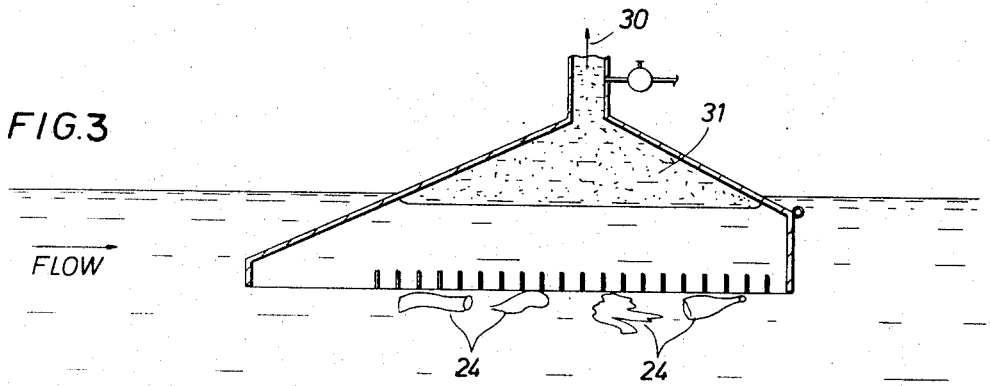
FIG. 3 discloses the mode of the invention for removing oil from the skimmer once it has been collected as shown in FIG. 2.

In accordance with the present invention there is provided a relatively simple skimmer design which overcomes most of the problems cited above. Referring to FIG. 1, there is provided a plan view of the invention which shows a skimmer 1 located between the pontoons 2 of a catamaran vessel. This vessel may be provided with independent propulsion means such as outboard motors 3, a hydraulic power system 4 for adjusting the position of the skimmer as shown in FIGS. 2 and 3, a positive displacement pump 5 for removing collected oil from the skimmer, and oil storage tanks 6 for storing collected oil. Power systems other than hydraulic are suitable for use and oil storage may of course be provided off the vessel. Also, while it is desirable that the catamaran be self-propelled, the vessel may be towed by independent means, whichever is best suited to the particular environment and nature of the oil spill. In addition, the skimmer of the invention need not be utilized with a catamaran but can be positioned along side another type of vessel. For that matter, the skimmer can be placed in a fixed position over a stream. The catamaran shown has a booming device 7 across the rear making the general plan shape to be that of a "U" although other plan shapes may be used with good results. Inasmuch as the rear portion of the funnel is the primary closure means between the two pontoons, device 7 has a primary function of joining the two pontoons so as to act as a structural unit. It can, however, be a frame covered by sheeting so as to act as a "backup" barrier. An inverted funnel 8 is suspended by hinges 9 or equivalent means within the confines of the "U" such that the lower portion of the funnel, preferably generally rectangular in shape, fits the inside contour of the vessel. The height of the funnel is of the order of the vessel draft, and the upper extremity of the funnel is typically 2 to 4 inches in diameter although such dimensions vary with the overall size of the skimmer. Short diverters shown in phantom, may be hinged to the forward ends of the pontoons with a means (not shown) for changing the angles thereof. Generally, any conventional booms, hydraulic boom arms or other types of diverters may be employed in front of the skimmer to make skimming more efficient. Diverters are more practical for use with a large oil spill in an unconfined area than a small spill in a confined or open area.

In FIG. 2 is shown a mode of collection whereby oil is picked up by a skimmer hinged within the pontoons of a catamaran. In order for the device to collect oil, there should be a current or the device must be pulled or propelled through the water, or both, to provide relative movement between the device and the oil 20 ahead of the skimmer. The skimmer is pivoted about a hinge point 21 so that a baffle system 22 is exposed to the oil which passes through the baffle grid and inside the collector walls 23 of the skimmer which contain air. Large debris 24 does not pass into the skimmer inasmuch as the baffles are sized to permit substantially the entry of only oil into the skimmer. The oil collects in a pool 25 inside the skimmer which is provided with an air vent 26 to permit displaced air to pass out of the skimmer. When current or skimmer speed is low so that the baffles are submerged and the open forward end of the funnel is at the water level, the baffle incline can be decreased, thereby allowing oil to enter more readily. The baffles 22 can be merely screens near the front of the funnel becoming deeper at the rear or a checkerboard arrangement or transverse louvers. Such baffles are particularly essential in oil collection in waves and currents.

The inclined baffle system of this invention has a number of advantages. Thus, oil can be concentrated at velocities greater than 2 feet per second which is not feasible with other known forms of skimmers. The baffles act as cells in damping the effects of waves and reducing turbulence inside the funnel during oil removal, which is a particularly valuable feature. Additionally, baffle sizing restricts the size of debris which can enter, so that the oversized materials are simply swept past. Finally, the baffles dissipate wave energy and minimize wave reflection and oil entrainment during collection.

In FIG. 3 is shown a mode of removal of collected oil as practiced in accordance with the invention. Debris 24 as shown in FIG. 2 is suspended beneath the baffles and does not enter into the skimmer. The skimmer during oil removal is positioned horizontally in the water so that the oil is trapped into the upper part of the funnel. If desired, the funnel can be further inclined so that the oil is pushed out of the top of the inverted funnel. Suction is provided at 30 by a positive displacement pump or other suitable means known in the art for removing oil 31 out of the skimmer. A primary advantage of the funnel is that the oil concentrates to a thick layer by buoyant forces so that there is a high oil-to-water ratio, whereby oil is easily removed without the removal of much water. As above mentioned, a serious disadvantage of other prior art skimmers is that a large quantity of water is removed along with oil, which creates difficult storage problems.

Figure 4:
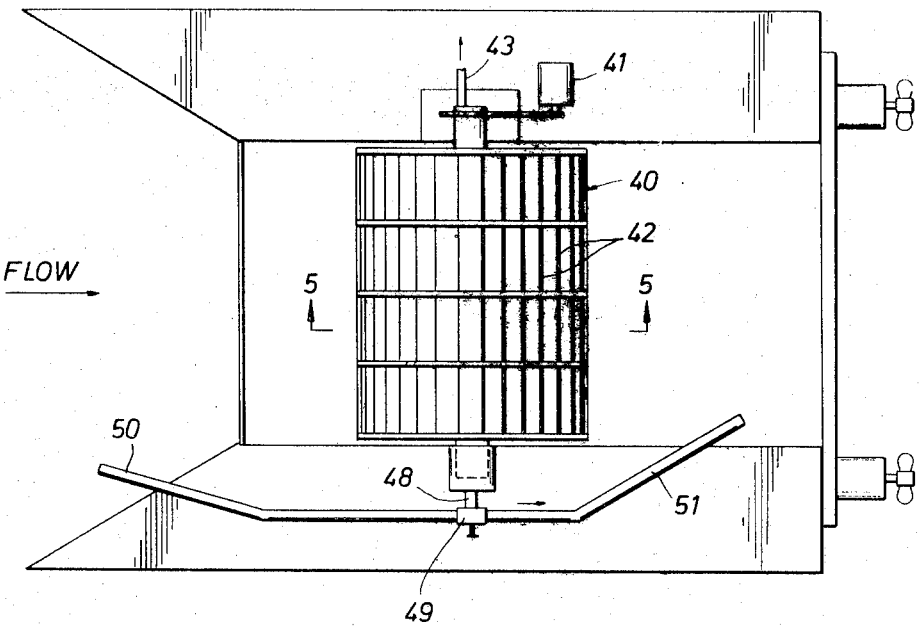
FIG. 4 depicts a species of the invention incorporating a continuously rotating drum.
Figure 5:
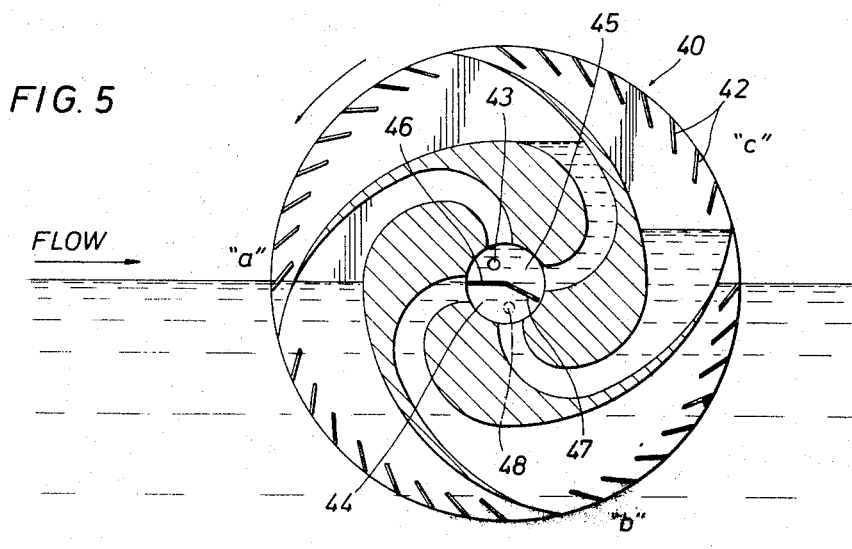
FIG. 5 is a cross-section 4—4 of the drum shown in FIG. 4.

In FIG. 4 is shown another application of the invention wherein the baffle system and the funnel are incorporated as one or more compartments in a rotating drum 40, the axis of the drum being horizontal and preferably arranged more or less perpendicular to the direction of flow. The drum may be rotated, for instance by a hydraulic motor 41, so as to present the baffle system to the approaching liquid (as in position *a* of FIG. 5). The baffles 42 are arranged around the periphery of the drum as shown. Continued rotation of the drum (to position *b* of FIG. 5) captures a quantity of liquid and by the continued reduction in the surface area in the compartment concentrates and delivers oil to storage via pipe 43 by means of an adjustable valve in or near the axis. One means of accomplishing the surface area reduction is by use of the modified spirals illustrated in FIG. 5 combined with simultaneous reduction in the axial dimension of the chamber. The adjustable valve includes two chambers, 44 principally for oil and 45 principally for water. Wall 46 dividing the two chambers is preferably horizontally fixed at about water level while wall 47 is adjustable to different angles to determine the oil/water ratio in each of chambers 44 and 45. As rotation continues (to position *c* of FIG. 5), oil chamber 44 is thereby closed and drained while water chamber 45 is opened and filled, whereby oil and water discharge into different segments of a hollow tube axle and oil is delivered to storage and water is selectively returned through line 48 and adjustable discharge valve 49 to the water body by pipe 50 or to a separate tank or to a quiescent area within the vessel via pipe 51. These valves are preferably automatic in operation but adjustable in their opening and closing positions. As rotation continues, the cycle is completed (at position *a* of FIG. 5) and the process above described is repeated.

EXAMPLE

In a test of the concept of the invention (as shown in FIG. 2), a rectangular box was employed having a grid of 3½ × 3½ × 3½ inch openings. A plywood barrier was provided in the rear of the box. The baffles were positioned at a 10° incline to the surface of the water in a current of 2 feet per second. No. 2 fuel oil was distributed ahead of the skimmer. Essentially no oil loss was noticed at 2 feet per second and the oil was successfully contained. Without the baffle, it was found that oil was lost at 1.25 feet per second.

Preferably, the baffled port and inverted funnel of the present invention are integral so that when the baffled port is inclined as shown in FIG. 2 to permit oil collection, the inverted funnel is thereby elevated to permit oil to collect beneath the funnel. This feature allows simplicity of design and operation of the skimmer. However, it will be understood that the baffled port and inverted funnel may be operated independently and still achieve good results.

It is also preferable that the skimmer be hinged at the rear since this facilitates lowering the funnel to force oil out of the skimmer. For example, this concept may be accomplished without a pump by letting the oil spill into an external container which may be formed by attaching a vertical wall to the outside of the funnel around the upper exit of the funnel. A hose communicating with the interior of the external container may be used to allow gravity flow of the oil in the external container to storage by raising the entire funnel and attached external container. It is feasible to hinge the skimmer in a more forward location and still achieve satisfactory results. As a further alternative, means can be provided for making the skimmer vertically adjustable as well as pivotable about the hinge points.

We claim as our invention:

1. An apparatus for removing oil from the surface of water comprising a rotatable drum immersed in the water up to about its axis of rotation, compartments arranged around the periphery of the drum for admitting oil and water to an axial chamber in the drum, said compartments comprising spiraling funnels diminishing in cross-sectional area from the periphery of the drum to the axial chamber, said axial chamber being divided into upper and lower rooms, the lower room providing an exit for a water-rich effluent, and the upper room providing an exit for an oil-rich effluent.

2. The apparatus of claim 1 wherein the rotatable drum is supported between longitudinal laterally spaced floats.

3. The apparatus of claim 1 wherein the axial chamber is divided into upper and lower rooms by adjoining walls, one of which being fixed horizontally at about water level and the other being adjustable to different angles to determine the oil to water ratio in each room.

* * * * *